(12) United States Patent
Shao et al.

(10) Patent No.: US 12,033,501 B2
(45) Date of Patent: *Jul. 9, 2024

(54) METHODS FOR TRAFFIC SCHEDULING AT INTERSECTIONS IN SMART CITIES AND INTERNET OF THINGS (IOT) SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN); Bin Liu, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 22 days.

This patent is subject to a terminal disclaimer.

(21) Appl. No.: 18/145,026

(22) Filed: Dec. 22, 2022

(65) Prior Publication Data

US 2023/0131858 A1   Apr. 27, 2023

Related U.S. Application Data

(63) Continuation of application No. 17/660,024, filed on Apr. 21, 2022, now Pat. No. 11,587,436.

(30) Foreign Application Priority Data

Mar. 29, 2022   (CN) .......................... 202210321872.2

(51) Int. Cl.
  *G08G 1/01*   (2006.01)
  *G08G 1/052*  (2006.01)

(52) U.S. Cl.
  CPC ......... *G08G 1/0145* (2013.01); *G08G 1/0133* (2013.01); *G08G 1/052* (2013.01)

(58) Field of Classification Search
  CPC ..... G08G 1/0145; G08G 1/0133; G08G 1/052
  See application file for complete search history.

(56) References Cited

U.S. PATENT DOCUMENTS

| 9,633,560 B1 * | 4/2017 | Gao ......................... G08G 1/07 |
| 2019/0043349 A1 * | 2/2019 | Hofman ............... G08G 1/0116 |

(Continued)

FOREIGN PATENT DOCUMENTS

| CN | 106971565 A | 7/2017 |
| CN | 109035808 A | 12/2018 |

(Continued)

OTHER PUBLICATIONS

White Paper on Urban Brain Development, Smart City Standard Working Group of National Beacon Commission, 2022, 59 pages.

(Continued)

*Primary Examiner* — Joseph H Feild
*Assistant Examiner* — Sharmin Akhter
(74) *Attorney, Agent, or Firm* — METIS IP LLC

(57) ABSTRACT

The present disclosure provides a method for traffic scheduling at an intersection in a smart city and an Internet of Things system. The method includes: for the intersection in a preset area, determining whether traffic congestion is likely to occur at the intersection during a next time period based on a comparison result between the number of the first vehicles and the number of second vehicles; in response to determining that the traffic congestion is likely to occur at the intersection during the next time period, determining whether a traffic scheduling strategy is needed to be switched based on traffic data information of the intersection during the next time period; and in response to determining (Continued)

that the traffic scheduling strategy is needed to be switched, switching a first traffic scheduling strategy to a second traffic scheduling strategy.

19 Claims, 5 Drawing Sheets

(56) References Cited

U.S. PATENT DOCUMENTS

| | | | |
|---|---|---|---|
| 2021/0012649 A1* | 1/2021 | Yusa | G08G 1/052 |
| 2021/0312799 A1 | 10/2021 | Tan | |
| 2022/0101103 A1 | 3/2022 | Fatemi et al. | |
| 2022/0319314 A1 | 10/2022 | Xu | |

FOREIGN PATENT DOCUMENTS

| | | |
|---|---|---|
| CN | 111127877 A | 5/2020 |
| CN | 111768618 A | 10/2020 |
| CN | 113256980 A | 8/2021 |
| CN | 113643528 A | 11/2021 |
| CN | 113920739 A | 1/2022 |
| WO | 2020259074 A1 | 12/2020 |
| WO | 2021243585 A1 | 12/2021 |

OTHER PUBLICATIONS

Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
Zhou, Yi et al., Graph Neural Network Driven Traffic Prediction Technology: Review and Challenge, Chinese Journal on Internet of Things, 5(4): 1-16, 2021.
Li, Na et al., Research on Video-Based Traffic Information Detection Algorithm, Computer Knowledge and Technology, 2010, 3 pages.
Qin, Weigang et al., Application of Genetic Algorithms & Artificial Neural Network in ITS, Chinese Journal of Scientific Instrument, 2004, 3 pages.
He, Jingsong, About Learning Space and Non-Monotonicity in Assessment of Classification Risk, Chinese Journal of Computers, 30(2): 168-175, 2007.
Decision to Grant a Patent for Invention in Chinese Application No. 202210321872.2 mailed on Jun. 13, 2022, 4 pages.
The Second Office Action in Chinese Application No. 202210321872.2 mailed on May 31, 2022, 20 pages.

* cited by examiner

METHODS FOR TRAFFIC SCHEDULING AT INTERSECTIONS IN SMART CITIES AND INTERNET OF THINGS (IOT) SYSTEMS THEREOF

CROSS-REFERENCE TO RELATED APPLICATIONS

This application is a continuation of U.S. application Ser. No. 17/660,024, filed on Apr. 21, 2022, which claims priority to Chinese Patent Application No. 202210321872.2 filed on Mar. 29, 2022, the contents of which are hereby incorporated by reference to its entirety.

TECHNICAL FIELD

The present disclosure relates to the field of Internet of Things (IoT) and cloud platforms, and in particular, to methods for traffic scheduling at intersections in smart cities and IoT systems.

BACKGROUND

Traffic congestion is often caused by traffic accidents, road occupation construction, special vehicle access, special transportation, etc. In order to alleviate the traffic congestion, traffic managers often need to formulate different traffic scheduling strategies. A process of formulating traffic scheduling strategies usually depends on human experience, which is easy to cause problems such as unscientific judgment, poor accuracy, and failure to respond in time.

Therefore, it is necessary to provide methods for traffic scheduling at intersections in smart cities and Internet of Things (IoT) systems to ensure scientific formulation of traffic scheduling strategies, so as to improve efficiency and quality of traffic management.

SUMMARY

One aspect of some embodiments of the present disclosure provides a method for traffic scheduling at an intersection in a smart city. The method may be executed by a traffic scheduling strategy control management platform. The method may comprise: determining, based on a road monitoring video of the intersection in a preset area before a current time, a first average speed of each vehicle among a plurality of vehicles on one or more roads connected with the intersection before the current time; determining a number of first vehicles, the first average speed of each first vehicle being less than a first preset threshold; obtaining the road monitoring video of the intersection at the current time when the number of the first vehicles is greater than a second preset threshold; obtaining, based on the road monitoring video at the current time, a second average speed of each vehicle among the plurality of vehicles at the current time; determining a number of second vehicles, the second average speed of each second vehicle being less than the first preset threshold; determining whether traffic congestion is likely to occur at the intersection during a next time period based on a comparison result obtained by comparing the number of the first vehicles with the number of second vehicles; in response to determining that the traffic congestion is likely to occur at the intersection during the next time period, determining whether a traffic scheduling strategy is needed to be switched based on traffic data information of the intersection during the next time period; and in response to determining that the traffic scheduling strategy is needed to be switched, switching a first traffic scheduling strategy to a second traffic scheduling strategy.

One aspect of some embodiments of the present disclosure provides an Internet of Things (IoT) system for traffic scheduling at an intersection in a smart city. The IoT system may comprise a user platform, a service platform, a traffic scheduling strategy control management platform, a sensor network platform, and an object platform interacting in sequence. The traffic scheduling strategy control management platform is configured to perform operations comprising: determining, based on a road monitoring video of the intersection in a preset area before a current time, a first average speed of each vehicle among a plurality of vehicles on one or more roads connected with the intersection before the current time; determining a number of first vehicles, the first average speed of each first vehicle being less than a first preset threshold; obtaining the road monitoring video of the intersection at the current time when the number of the first vehicles is greater than a second preset threshold; obtaining, based on the road monitoring video at the current time, a second average speed of each vehicle among the plurality of vehicles at the current time; determining a number of second vehicles, the second average speed of each second vehicle being less than the first preset threshold; determining whether traffic congestion is likely to occur at the intersection during a next time period based on a comparison result obtained by comparing the number of the first vehicles with the number of second vehicles; in response to determining that the traffic congestion is likely to occur at the intersection during the next time period, determining whether a traffic scheduling strategy is needed to be switched based on traffic data information of the intersection during the next time period; and in response to determining that the traffic scheduling strategy is needed to be switched, switching a first traffic scheduling strategy to a second traffic scheduling strategy.

Another aspect of some embodiments of the present disclosure provides a non-transitory computer readable storage medium storing a set of instructions. When the set of instructions are executed by at least one processor, the at least one processor may perform a method for traffic scheduling at an intersection in a smart city.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
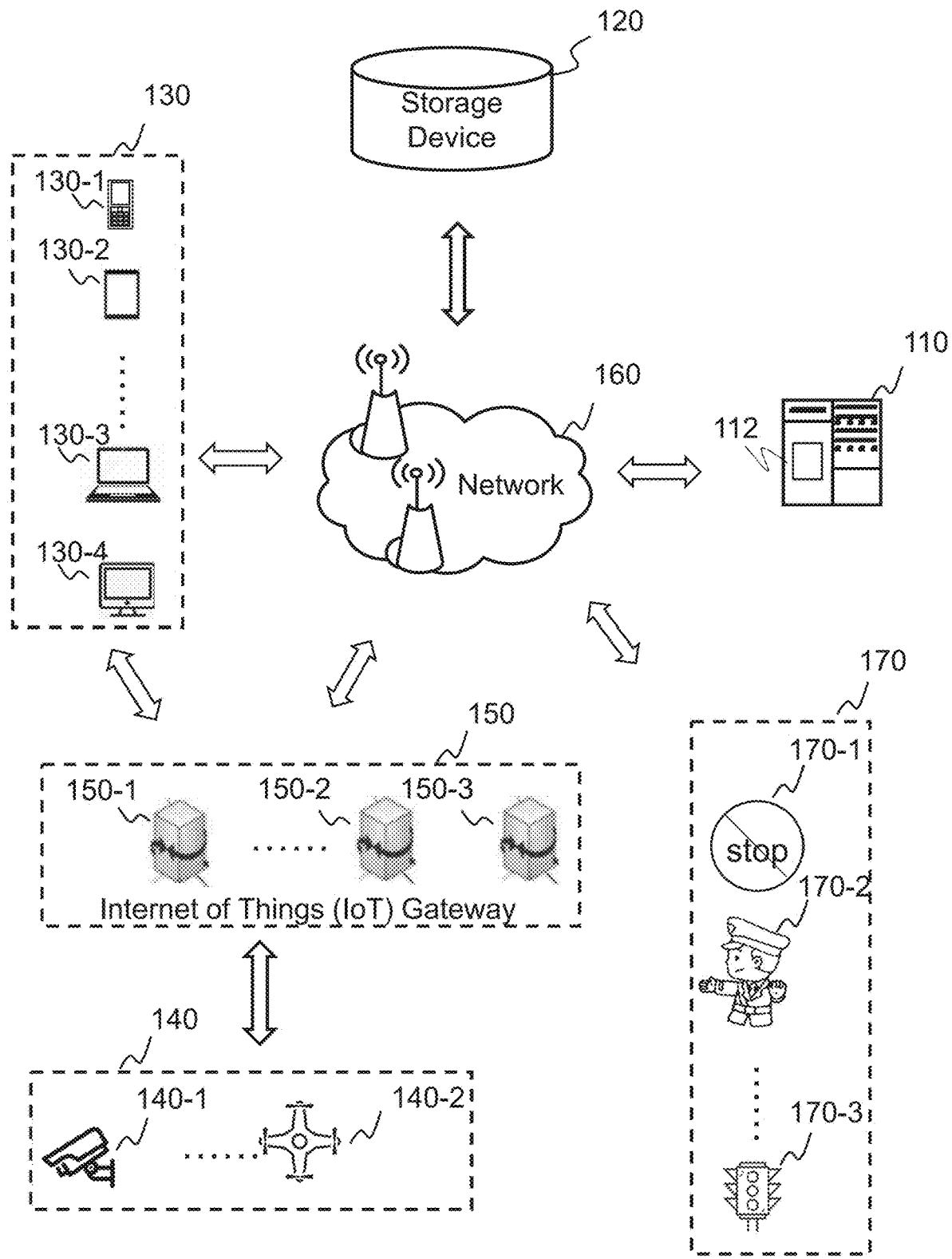
FIG. 1 is a schematic diagram illustrating an exemplary application scenario of an Internet of Things (IoT) system for controlling a traffic scheduling strategy in a smart city according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary application scenario of an Internet of Things (IoT) system for controlling a traffic scheduling strategy in a smart city according to some embodiments of the present disclosure. In some embodiments, an application scenario may include a server 110, a storage device 120, a user terminal 130, a sensing device 140, an IoT gateway 150, and a network 160.

In some embodiments, the server 110 may be a single server or a server group. The server group may be centralized or distributed. For example, the server 110 may be a distributed system. In some embodiments, the server 110 may be local or remote. In some embodiments, the server 110 may be implemented on a cloud platform. In some embodiments, the server 110 or a portion of the server 110 may be integrated into the sensing device 140.

In some embodiments, the server 110 may include a processing device 112. The processing device 112 may be configured to obtain, analyze, and process information to perform one or more functions described in the present disclosure. For example, the processing device 112 may obtain traffic data monitored by the sensing device 140 and determine areas with traffic congestion. As another example, the processing device 112 may, based on the areas with traffic congestion, generate a scheduling strategy, issue a control instruction to a traffic scheduling center 170, and control the traffic scheduling center 170 to perform traffic management according to the traffic scheduling strategy.

In some embodiments, the processing device 112 may include one or more processing engines (e.g., single-chip processing engines or multi-chip processing engines). As an example, the processing device 112 may include a central processing unit (CPU), an application specific integrated circuit (ASIC), or like, or any combination thereof.

The storage device 120 may be configured to store data and/or instructions, for example, the storage device 120 may be configured to store the traffic data monitored by the sensing device 140. The storage device 120 may obtain data and/or instructions from, for example, the server 110, the user terminal 130, or the like. In some embodiments, the storage device 120 may store data and/or instructions executed or used by the processing device 112 to implement the exemplary methods described in the present disclosure.

The user terminal 130 may refer to a terminal used by the user for inputting traffic data information, querying traffic information, querying traffic scheduling strategies, or other information. For example, the user terminal 130 may include, but is not limited to, a smartphone 130-1, a tablet 130-2, a laptop 130-3, a processor 130-4, other devices with input and/or output functions, or any combination thereof. In some embodiments, the user terminal 130 may be associated with the server 110. For example, the user terminal 130 may also feed back traffic congestion information. In some embodiments, the user terminal 130 may be one or more users, which may include users who directly use service or other related users.

The sensing device 140 may refer to a device for obtaining the traffic data information. For example, the sensing device 140 may include, but is not limited to, a road monitoring device 140-1 and an Unmanned Aerial Vehicle (UAV) shooting device 140-2. In some embodiments, the road monitoring device 140-1 may be an infrared camera or a high-definition digital camera. In some embodiments, the UAV shooting device 140-2 may be an unmanned aircraft operated by a radio remote control device. For example, the UAV shooting device 140-2 may include a multi-rotor UAV, an unmanned helicopter, a solar-powered UAV, or the like. In some embodiments, the sensing device 140 may be configured as one or more object sub-platforms of the IoT. The road monitoring device 140-1 may be a sub-platform of the road monitoring device, and the UAV shooting device 140-2 may be a sub-platform of the UAV shooting device.

The IoT gateway 150 may refer to a data channel and a gateway where the user terminal 130 and/or the sensing device 140 upload monitoring data. For example, the IoT gateway 150 may include, but is not limited to, an IoT gateway of the road monitoring device 150-1, an IoT gateway of the UAV shooting device 150-2, and an IoT gateway of the user terminal 150-3. In some embodiments, the road monitoring device 140-1 may upload road monitoring data through the IoT gateway of the road monitoring device 150-1. The UAV shooting device 140-2 may upload road monitoring data through the IoT gateway of the UAV shooting device 150-2. The user terminal 130 may upload road monitoring data through the IoT gateway of the user terminal 150-3. In some embodiments, the server 110 may issue control instructions to control operation of the road monitoring device 140-1 through the IoT gateway of the road monitoring device 150-1. In some embodiments, the server 110 may issue control instructions to control operation of the UAV shooting device 140-2 through the IoT gateway of the UAV shooting device 150-2.

The network 160 may provide a channel for information and/or data exchange. In some embodiments, the information may be exchanged among the server 110, the storage device 120, the user terminal 130, the sensing device 140, the IoT gateway 150, and the traffic scheduling center 170 through the network 160. For example, the server 110 may receive a request to query traffic data sent by the user terminal 130 through the network 160. As another example, the server 110 may obtain traffic monitoring data uploaded by the user terminal 130 and/or the sensing device 140 through the network 160 and store the traffic monitoring data in the storage device 120. For another example, the server 110 may obtain a feedback of the traffic scheduling center 170 through the network 160.

The traffic scheduling center 170 may refer to a center for performing traffic scheduling strategies. For example, the traffic scheduling center 170 may perform operations including, but not limited to, a temporary traffic control 170-1, a traffic police scheduling 170-2, or a traffic light adjustment 170-3. In some embodiments, the traffic scheduling center 170 may obtain the traffic scheduling strategy issued by the server 110 to perform the traffic light adjustment 170-3. In some embodiments, the traffic scheduling center 170 may obtain the traffic scheduling strategy issued by the server 110 to perform the traffic police scheduling 170-2. In some embodiments, the traffic scheduling center 170 may obtain the traffic scheduling strategy issued by the server 110 to perform the temporary traffic control 170-1.

It should be noted that the above descriptions of the application scenario are intended to be convenient, and one or more embodiments of the present disclosure may not be limited to the scope of the disclosure. For those skilled in the art, various modifications or changes may be made based on the description of the present disclosure. For example, the application scenario may also include a database. For example, the application scenario may be implemented on other devices to achieve similar or different functions. However, changes and modifications do not depart from the scope of the present disclosure.

The IoT system is an information processing system including at least one of an object platform, a sensor network platform, a management platform, a service platform, or an user platform. The management platform may realize the overall planning and coordination of the connection and cooperation between various functional platforms (such as the sensor network platform and the object platform), gather information of the IoT operation system, and provide functions of perception management and control management for the IoT operation system. The sensor network platform may realize a connection between the management platform and the object platform to play sensing communication functions of perception information and control information. The object platform may be a functional platform for generating the perceptual information and executing the control information. The service platform may refer to a platform which provides input and output services for users. The user platform may refer to a platform dominated by users, which includes a platform for obtaining user needs and feeding information back to the users.

The information processing flow in the IoT system may be divided into a processing flow of the perception information and a processing flow of the control information. The control information may be information generated based on the perception information. The processing flow of the perceptual information may include obtaining the perceptual information by the object platform and transmitting the perceptual information to the management platform through the sensor network platform. The processing flow of the control information may include delivering the control information to the object platform through the sensor network platform so as to realize control of corresponding object.

In some embodiments, when the IoT system is applied to city management, it may be referred to as an IoT system in a smart city.

Figure 2:
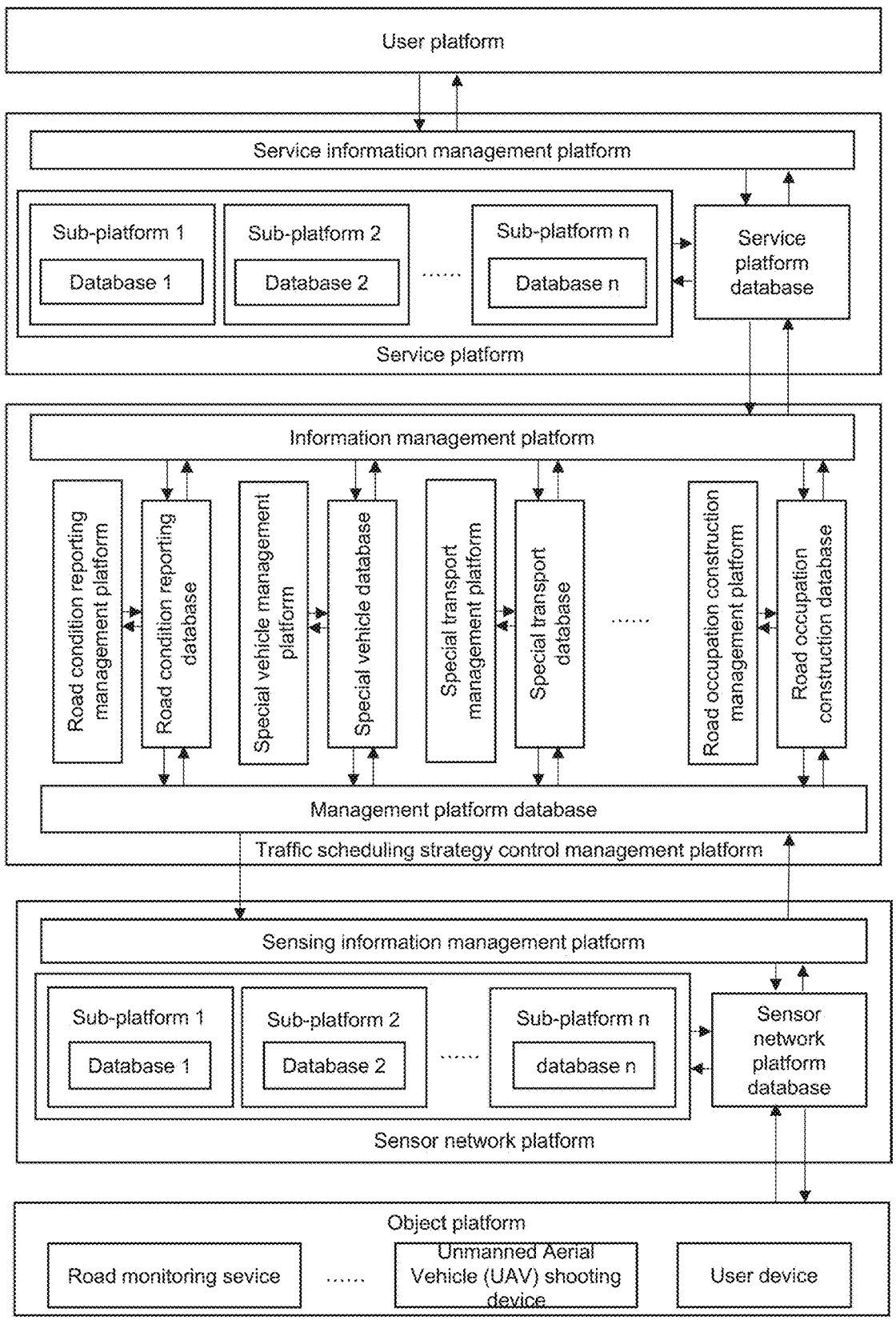
FIG. 2 is a schematic diagram illustrating an exemplary IoT system for controlling a traffic scheduling strategy in a smart city according to some embodiments of the present disclosure.

FIG. 2 is a schematic diagram illustrating an exemplary IoT system for controlling a traffic scheduling strategy in a smart city according to some embodiments of the present disclosure.

The user platform may refer to a platform dominated by users, which includes a platform for obtaining user needs and feeding information back to the users. For example, the user platform may obtain user's input instruction and query the traffic data information through the user terminal (e.g., the user terminal 130). As another example, the user platform may obtain user's control instruction through the user terminal to control the road monitoring device (e.g., the road monitoring device 140-1) and/or the UAV shooting device (e.g., the UAV shooting device 140-2). As another example, the user platform may feed traffic scheduling results back to the users.

The service platform may refer to a platform which provides input and output services for users. For example, the service platform may obtain query instructions issued by the user through the user platform to query the traffic data information and feed the traffic data information back to the user. In some embodiments, the service platform may include a service information management platform and a plurality of service sub-platforms.

The traffic scheduling strategy control management platform may be a platform for overall planning and coordination of the connection and cooperation between various functional platforms, gathering all information of the IoT operation system, and provide functions of perception management and control management for the IoT operation system. For example, the traffic scheduling strategy control management platform may obtain the traffic data information in a preset area during a current time period and predict one or more target areas where traffic congestion is likely to occur in the preset area during a next time period based on the traffic data information in the preset area during the current time period. For another example, the traffic scheduling strategy control management platform may determine whether the traffic scheduling strategy is needed to be switched based on the traffic data information in the one or more target areas during the next time period. In response to determining that the traffic scheduling strategy is needed to be switched, the traffic scheduling strategy control management platform may switch a first traffic scheduling strategy to a second traffic scheduling strategy.

In some embodiments, the traffic scheduling strategy control management platform may include an information management platform and a plurality of management sub-platforms.

In some embodiments, the traffic scheduling strategy control management platform may include one or more management sub-platforms such as a road condition reporting management platform, a special vehicle management platform, a special transport management platform, and a road occupation construction management platform. Different management sub-platforms may provide information independently for the information management platform through different management platform sub databases. For example, the road condition reporting management platform may provide road condition information for the information management platform through a road condition reporting database. The special vehicle management platform may provide special vehicle information (such as quantity, duty status, etc.) for the information management platform through a special vehicle database. The special transport management platform may provide special transport information (such as quantity, travel time, location, etc.) for the information management platform through a special transport database. The road occupation construction management platform may provide road occupation construction information (such as locations of road occupation construction, estimated time of road occupation, etc.) for the information management platform through a road occupation construction database. The information management platform may comprehensively manage the obtained information and send the obtained information to the service platform according to the user needs.

The sensor network platform may refer to a functional platform for realizing a connection between the traffic scheduling strategy control management platform and the object platform to play sensing communication functions of perception information and control information. In some embodiments, the sensor network platform may be configured as an IoT gateway (e.g., an IoT gateway 150), which may be used to establish a channel for uploading the perception information and delivering the control information between the user terminal (e.g., the user terminal 130) and/or the sensing device (e.g., the sensing device 140) and the traffic scheduling strategy control management platform. In some embodiments, the sensor network platform may include a plurality of sensor network sub-platforms, and the plurality of sensor network sub-platforms may be a plurality of sensor network sub-platforms corresponding to different object platforms. In some embodiments, each of the plurality of the sensor network sub-platforms may be configured as an IoT gateway in different communication networks (e.g., an IoT gateway of the road monitoring device 150-1, an IoT gateway of the UAV shooting device 150-2, and an IoT gateway of the user terminal 150-3). Each of the plurality of the sensor network sub-platforms may process the monitoring data uploaded by the road monitoring device, the UAV shooting device, and the user terminal and store the processed monitoring data to the sensor network platform database, so as to distribute the monitoring data to different sensor network platform sub databases for processing and storage. The processed monitoring data may be collected and stored in the sensor network platform database and transmitted to a sensor information management platform, and the processed monitoring data may be uniformly transmitted to the traffic scheduling strategy control management platform and stored in the management platform database from the sensor information management platform.

The object platform may refer to a functional platform for generating the perception information and executing ultimately the control information. In some embodiments, the object platform may be configured as a road monitoring device, a UAV shooting device, and a user terminal. In some embodiments, the object platform may be classified into multiple object sub-platforms based on different types of sensing devices. For example, the object platform may be classified into road monitoring device platforms including one or more road monitoring devices based on road monitoring device, the object platform may be classified into UAV shooting device platforms including one or more UAV shooting devices based on the UAV shooting device, and the object platform may be classified into user terminal platforms including one or more user terminals based on the user terminal.

The sub-platforms may refer to a part of the platforms classified based on types of task. In some embodiments, the service platform, the traffic scheduling strategy control management platform, the sensor network platform, and the object platform may all be provided with multiple sub-platforms according to needs. The sub-platforms may assist the platforms to process information more efficiently and solve the problem of insufficient computing power of the platforms.

The database may refer to a collection of stored data. For example, the management platform database may store the data information of road condition reporting, special vehicles, special transportation, occupying road construction.

The sub database may refer to a partial data set of the database classified based on data type. In some embodiments, the service platform database, the management platform database, and the sensor network platform database may all be provided with multiple sub databases according to needs.

In some embodiments, the management platform database may obtain the traffic data information based on the object platform, and the management sub-platform database may obtain the traffic data information based on the management platform database.

In some embodiments, the management platform database may obtain the traffic data information through the sensing information management platform and the sensor network platform database based on the object platform.

In some embodiments, the management platform database may obtain the special vehicle driving route information from the road monitoring device through the sensor information management platform and the sensor network platform database and upload the special vehicle driving route information to the special vehicle database corresponding to the special vehicle management platform.

The controlling of traffic scheduling strategy in a smart city may be implemented through IoT functional architectures of the above platforms, which realizes a closed-loop of an information process to process the IoT information more fluently and efficiently.

Figure 3:
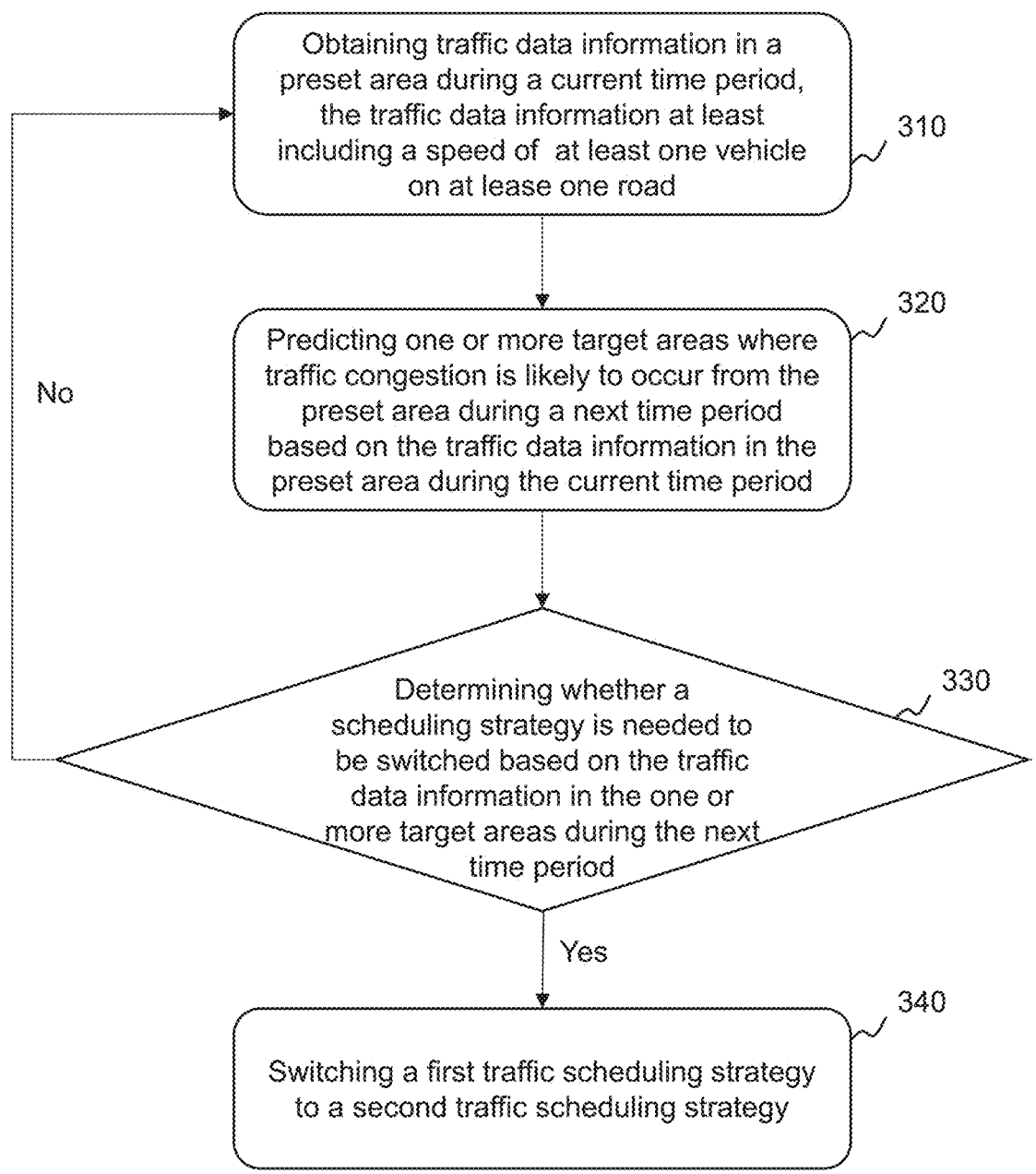
FIG. 3 is a flowchart illustrating an exemplary process of a method for controlling a traffic scheduling strategy in a smart city according to some embodiments of the present disclosure.

FIG. 3 is a flowchart illustrating an exemplary process of a method for controlling a traffic scheduling strategy in a smart city according to some embodiments of the present disclosure. As shown in FIG. 3, the process 300 may include the following steps. In some embodiments, the process 300 may be executed by the processing device 112.

In step 310, the process device 112 may obtain traffic data information in a preset area during a current time period, and the traffic data information may at least include a speed of at least one vehicle on at least one road.

The preset area may refer to an area set in advance. In some embodiments, the preset area may include a city, a district, a street, or the like. For example, the preset area may be Beijing. For example, the preset area may be Chaoyang District, Beijing. For example, the preset area may be Chaoyang North Road, Chaoyang District, Beijing.

The current time period may be a time period when the traffic data information is obtained. For example, the current time period may be from 18:00 on Jan. 1, 2032 to 18:10 on Jan. 1, 2032.

The traffic data information during the current time period may include data information reflecting traffic conditions during the current time period. In some embodiments, the traffic data information during the current time period may include information, such as road condition information, special vehicle information, special transport information, road occupation construction information, etc., reported by the user during the current time period In some embodiments, the traffic data information during the current time period may include vehicle features (e.g., a number of vehicles, vehicle types, etc.) obtained by the road monitoring device or the UAV shooting device. In some embodiments, the traffic data information during the current time period may at least include the speed of at least one vehicle on at least one road during the current time period obtained by the road monitoring device. The speed of at least one vehicle may refer to an average speed of at least one vehicle on at least one road.

In some embodiments, the processing device may obtain the traffic data information based on video or image information provided by the object platform (e.g., the sensing device 140). In some embodiments, the processing device may obtain the traffic data information based on information of the road conditions, special vehicles, special transportation, and occupying road construction reported by the object platform (e.g., the user terminal 130).

In some embodiments, the management platform database may obtain the traffic data information based on the object platform, and the management sub-platform database may obtain the traffic data information based on the management platform database. More descriptions regarding obtaining the traffic data information in the preset area during the current time period may be found elsewhere in the present disclosure, for example, FIG. 2 and its relevant descriptions thereof.

In step 320, the process device 112 may predict one or more target areas where traffic congestion is likely to occur in the preset area during a next time period based on the traffic data information in the preset area during the current time period.

The next time period may be a time period after the current time period (for example, next 5 minutes, 10 minutes, 30 minutes, etc.). For example, if the current time period may be from 18:00 on Jan. 1, 2032 to 18:10 on Jan. 1, 2032, and the next time period may be from 18:10 on Jan. 1, 2032 to 18:20 on Jan. 1, 2032.

The traffic congestion may refer to a phenomenon where vehicles are crowded and moving slowly. For example, if a traffic accident occurs on the road corresponding to a high-speed entrance resulting in traffic congestion, a large number of vehicles may flow into other adjacent entrances of the high-speed entrance, causing traffic congestion of other roads, intersections, or entrances. For another example, vehicles may take a detour in a certain place with a traffic accident, occupying road construction, special vehicle traffic, special transportation, etc. In this case, the vehicles will pass through other roads (e.g., adjacent roads), which is bound to affect traffic of other roads.

The target area may refer to an area where traffic congestion is likely to occur in the preset area during the next time period. In some embodiments, the preset area may include a certain location, intersection, or the like. For example, the target area may be an intersection of Chaoyang North Road and Binhe Road, Chaoyang District, Beijing. For example, the target area may be a West Gate of Tsinghua University. When a node connected to a road is predicted as the target area, the road may be considered to be congested. Therefore, the predicted target area may reflect the traffic congestion condition.

In some embodiments, the processing device may predict the target area in a variety of ways.

In some embodiments, the processing device may input the traffic data information during the current time period into a traffic state prediction model, and the traffic state prediction model may output one or more target areas where traffic congestion is likely to occur in the preset area during the next time period.

The traffic state prediction model may be a deep learning model, such as a Graph Neural Network (GNN) model, etc. More descriptions about the traffic state prediction model may be found elsewhere in the present disclosure (for example, FIG. 4 and its relevant descriptions thereof).

In step 330, the processing device may determine whether the traffic scheduling strategy is needed to be switched based on the traffic data information in the one or more target areas during the next time period.

The traffic data information during the next time period may include data information reflecting traffic conditions during the next time period. In the embodiment, the traffic data information during the next time period may at least include the speed of the at least one vehicle on at least one road during the next time period.

In some embodiments, the processing device may use a first model to process the traffic data information during the current time period to obtain the traffic data information in the one or more target areas during the next time period. For example, the processing device may input the traffic data information during the current time period to the first model, and the first model may output the traffic data information in the one or more target areas during the next time period. The first model may include a deep neural network (DNN), a recurrent neural network (RNN), a convolutional neural network (CNN), or the like. The first model may be trained by the processing device using the traffic data information during a historical current period as training data, so that the first model may output the traffic data information in the one or more target areas during the historical next period based on the traffic data information during the current time period. The label corresponding to the training data may be determined by the historical data.

The traffic scheduling strategy may refer to a strategy to maintain traffic order in the preset area. In some embodiments, the traffic scheduling strategy may include one or more of a number of traffic police scheduled, duration of traffic lights, and temporary traffic control.

The number of traffic police scheduled may refer to a number of traffic police needed to be scheduled. For example, if a road occurs serious traffic congestion due to an accident, five traffic policemen need to be scheduled for on-site management.

The duration of traffic lights may refer to signal duration of red light, green light, and/or yellow light. For example, when a special vehicle passes through an intersection, in order to ensure passage of special vehicles, the duration of green light will be extended in this direction and the duration of red light will be extended in the other direction.

The temporary traffic control may refer to measures of prohibiting and restricting traffic in violation of daily traffic rules. For example, the processing device may implement prohibiting two-way passage of the temporary traffic control on the road due to the front road occupation construction.

In some embodiments, it may be determined that the traffic scheduling strategy is needed to be switched in the target area when a reduced value or an increased value of a speed of a vehicle in the target area during the next time period relative to a speed of a vehicle in the target area during the current time period is greater than or equal to a preset threshold. The reduced value or the increased value of the speed of the vehicle may be obtained based on the speed of the vehicle in the target area during the next time period minus the speed of the vehicle in the target area during the current time period. The speed of the vehicle in the target area during the next time period may be obtained based on the traffic data information during the next time period, and the speed of the vehicle during the current time period in the target area may be obtained based on the traffic data information during the current time period. For example, assuming that the speed of the vehicle in the target area during the current time period is 40 km/h and the preset threshold is 10 km/h, the processing device may determine that the traffic scheduling strategy is needed to be switched in the target area when the speed of the vehicle in the target area during the next time period is 25 km/h (the reduced value is 15 km/h, which is greater than the preset threshold); the processing device may determine that the traffic scheduling strategy does not need to be switched in the target area when the speed of the vehicle in the target area during the next time period is 45 km/h (the increased value is 5 km/h, which is less than the preset threshold).

In step 340, in response to determining that the traffic scheduling strategy is needed to be switched, the processing device may switch a first traffic scheduling strategy to a second traffic scheduling strategy.

The first traffic scheduling strategy may refer to a traffic scheduling strategy in the preset area during the current time period. For example, the first traffic scheduling strategy in the preset area may be that the number of traffic police scheduled is 0, the duration of both red light and green light are 30 seconds, and the temporary traffic control is not performed in a first target area; the number of traffic police scheduled is 2, the duration of both red light and green light are 30 seconds, and the temporary traffic control is not performed in a second target area.

The second traffic scheduling strategy may refer to a traffic scheduling strategy in the preset area during the next time period. For example, assuming that the first traffic scheduling strategy in the preset area is that the number of traffic police scheduled is 0, the duration of both red light and green light are 30 seconds, and the temporary traffic control is not performed in the first target area; the number of traffic police scheduled is 2, the duration of both red light and green light are 30 seconds, and the temporary traffic control is not performed in the second target area, the processing device may determine that the traffic scheduling strategy is needed to be switched in both the first target area and the second target area. If it is detected that an occupying road construction occurs in the first target area and an accident occurs in the second target area, the second traffic scheduling strategy in the preset area may be that the number of traffic police scheduled is 3 and no thoroughfare of the temporary traffic control is performed in the first target area; the number of traffic police scheduled is 5 and the duration of red light is adjusted to 60 seconds and the duration of green light is adjusted to 15 seconds in a predicted congestion direction, and the temporary traffic control is not performed in the second target area.

In some embodiments, the processing device may switch the first traffic scheduling strategy to the second traffic scheduling strategy in a variety of ways.

In some embodiments, the processing device may switch the first traffic scheduling strategy to the second traffic scheduling strategy by determining the traffic data information (e.g., the speed of the vehicle in the target area) of the vehicle in the target area during the current time period and the next time period. For example, each target area may include several speed ranges (for example, a speed limit in the target area is 60 km/h, a first speed range is 0-5 km/h, a second speed range is 5-10 km/h, a third speed range is 10-15 km/h, a fourth speed range is 15-20 km/h, a fifth speed range is 20-25 km/h, a sixth speed range is 25-30 km/h, a seventh speed range is 30-35 km/h, an eighth speed range is 35-40 km/h is, a ninth speed range is 40-45 km/h, a tenth speed range is 45-60 km/h) and the corresponding traffic scheduling strategies may be stored in a same database. The corresponding traffic scheduling strategies may include following scheduling strategies. For example, when the speed of the vehicle in the target area is in the tenth speed range, which indicates that the target area is unobstructed without congestion, the corresponding scheduling strategy may be that the duration of red light is not needed to extend, the number of traffic police scheduled is 0, and the temporary traffic control is not performed; when the speed of the vehicle in the target area is in the eighth speed range, which indicates the target area is slightly congested, the corresponding scheduling strategy is that the duration of red light signal is needed to extend to 40 seconds, the number of the traffic police scheduled is 0, and the temporary traffic control is not performed; when the speed of the vehicle in the target area is in the fifth speed range, which indicates the target area is general congestion, the corresponding scheduling strategy is that the duration of red light is needed to extend to 60 seconds, the number of traffic police scheduled is 1, and the temporary traffic control is not performed; when the speed of the vehicle in the target area is in the first speed range, which indicates that the target area is very congested, the corresponding scheduling strategy is that the duration of red light is not needed to extend, the number of traffic police scheduled is 5, and no thoroughfare of the traffic control is performed. The processing device may switch the first traffic scheduling strategy to the second traffic scheduling strategy through the database based on the traffic data information in one or more target areas during the current time period and the next time period. For example, if an intersection is generally congested during the current time period, the scheduling strategy of the intersection in the first traffic scheduling strategy may be that the duration of traffic lights is needed to extend to 60 seconds, the number of traffic police scheduled is 1, and the temporary traffic control is not performed. It is predicted that the intersection will be unobstructed during the next time period, so the scheduling strategy of the intersection in the second traffic scheduling strategy may be switched to a scheduling strategy, the scheduling strategy is that the duration of red light is not needed to extend, the number of traffic police scheduled is 0, and the temporary traffic control is not performed. For another example, if an intersection is generally congested during the current time period, the scheduling strategy of the intersection in the first traffic scheduling strategy may be that the duration of traffic lights is needed to extend to 60 seconds, the number of traffic police scheduled is 1, and the temporary traffic control is not performed. It is predicted that the intersection will be very congested during the next time period, so the scheduling strategy of the intersection in the second traffic scheduling strategy may be switched to a scheduling strategy, the scheduling strategy is that the duration of red light is not needed to extend, the number of traffic police scheduled is 5, and no thoroughfare of the traffic control is not performed.

In some embodiments, the processing device may input the first traffic scheduling strategy and the traffic data information in the one or more target areas during the current time period and the next time period into the traffic scheduling strategy prediction model, and then the second traffic scheduling strategy may be output by the traffic scheduling strategy prediction model.

The traffic scheduling strategy prediction model may be a depth learning model, for example, DNN, RNN, CNN, etc. More description about the traffic scheduling strategy prediction model may be found elsewhere of the present disclosure thereof (for example, FIG. 5 and its relevant descriptions).

The first traffic scheduling strategy is switched to the second traffic scheduling strategy, which can reduce blindness and dependence on experience of traffic managers in formulating traffic scheduling strategies, improve scientificity, accuracy, and timeliness of traffic strategy determination method at a certain extent, so as to improve efficiency and quality of traffic management.

It should be noted that the above descriptions of the relevant process of the method for controlling the traffic scheduling strategy in a smart city are intended to be convenient, and one or more embodiments of the present disclosure may not be limited to the scope of the disclosure. For those skilled in the art, various modifications and changes may be made to the method for controlling the traffic scheduling strategy of the smart city under the guidance of the present disclosure. Those modifications and changes may be within the scope of the protection of one or more embodiments of the disclosure.

Figure 4:
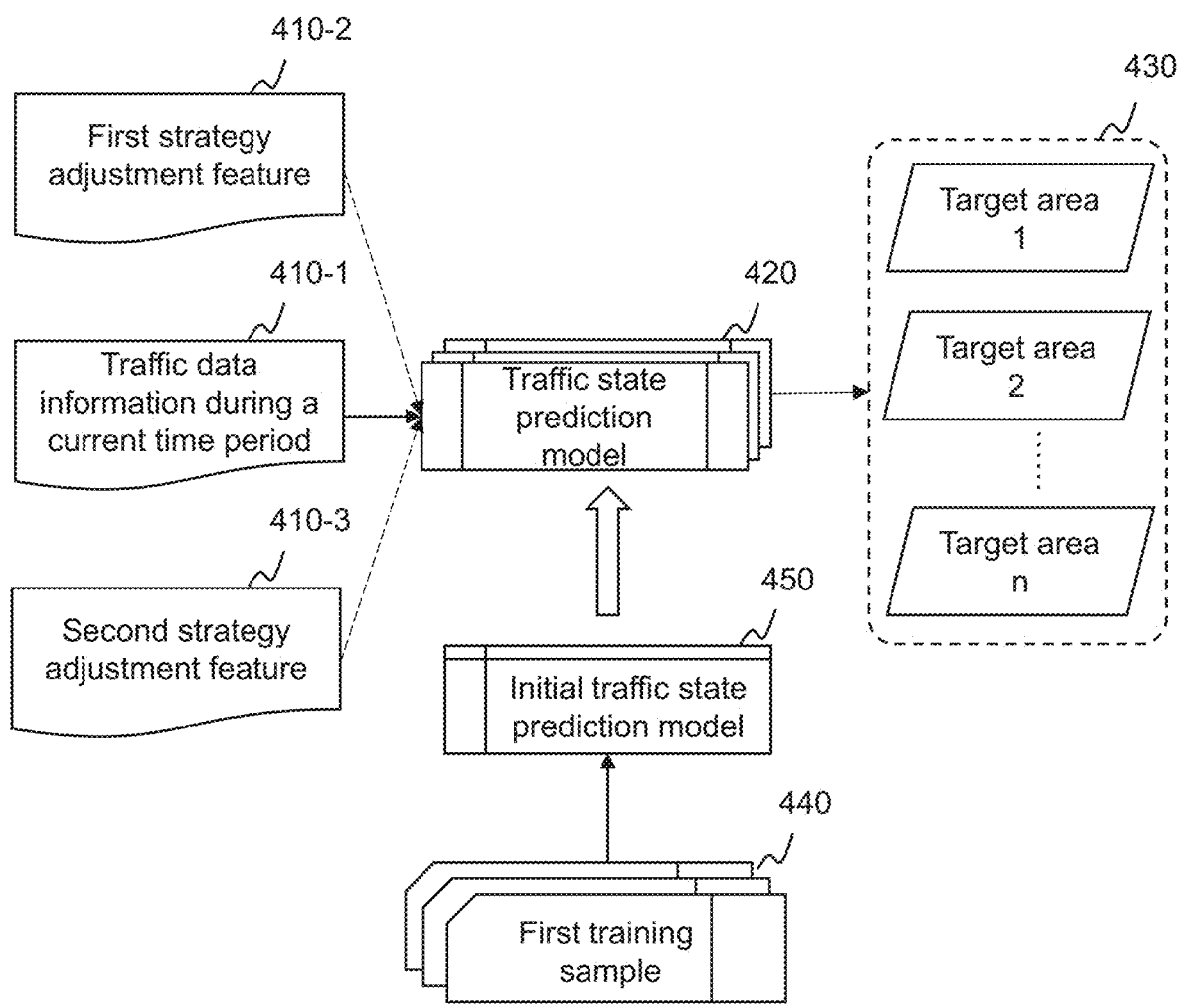
FIG. 4 is a schematic diagram illustrating an exemplary structure of a traffic state prediction model according to some embodiments of the present disclosure.

FIG. 4 is a schematic diagram illustrating an exemplary structure 400 of a traffic state prediction model according to some embodiments of the present disclosure.

In some embodiments, as shown in FIG. 4, an input of the traffic state prediction model 420 may include the traffic data information 410-1 during the current time period and an output of the traffic state prediction model 420 may be one or more target areas 430.

In some embodiments, the GNN model may process graph data constructed based on a relationship of intersections of each road to determine the one or more target areas 430. In some embodiments, the graph may include a plurality of nodes and edges, the nodes correspond to the intersections of each road, and the edges correspond to a relationship between the road connections. In some embodiments, the edges correspond to a spatial position relationship between roads, and the spatial position relationship may be a relative position relationship, a distance relationship, etc. In some embodiments, the nodes and edges may include their respective features, respectively. In some embodiments, a node feature may include whether there are traffic lights at the intersection of each road and the duration of traffic lights. An edge feature may include a lane type corresponding to the road, a number of lanes, and whether there is an underpass tunnel.

In some embodiments, as shown in FIG. 4, parameters of the traffic state prediction model 420 may be trained by a plurality of labeled first training samples 440. In some embodiments, the processing device may obtain a plurality of groups of first training samples 440, and each group of first training samples 440 may include a plurality of training data and labels corresponding to the training data. The training data may include historical traffic data information. The historical traffic data information may be traffic data information during the historical time period. The labels of training data may be the one or more target areas where traffic congestion is likely to occur in the preset area during a historical next time period, which is determined based on the historical traffic data information.

Parameters of an initial traffic state prediction model 450 may be updated to obtain a trained traffic state prediction model 420 through the plurality of groups of first training samples 440.

In some embodiments, the processing device may iteratively update the parameters of the initial traffic state prediction model 450 to make a loss function of the initial traffic state prediction model meet a preset condition based on the plurality of groups of first training samples. For example, the loss function converges, or a value of the loss function is less than a preset value. When the loss function meets the preset condition, a training process of the initial traffic state prediction model is completed to obtain a trained initial traffic state prediction model 450. The traffic state prediction model 420 and the trained initial traffic state prediction model 450 may have a same structure.

In some embodiments, a node feature of the traffic state prediction model 420 may also include at least one of a first strategy adjustment feature 410-2 or a second strategy adjustment feature 410-3.

The first strategy adjustment feature 410-2 may refer to adjusting the one or more target areas 430 based on the speed of the vehicle in the target area.

In some embodiments, the processing device may obtain the speed of the vehicle in the target area and adjust the target area based on the speed of the vehicle in the target area.

In some embodiments, the processor may obtain the speed of the vehicle in the target area based on the road monitoring video.

In some embodiments, the processor may adjust the target area based on the speed of the vehicle in the target area. For example, if an area is predicted as a target area due to the slow driving of vehicles, the traffic condition will return to a normal condition (not congested) after the vehicles leave. In this case, it may be considered that traffic congestion will not occur in this area during the next time period, so this area is not predicted as the target area.

In some embodiments, the processing device may determine a first average speed of each of a plurality of vehicles before the current time on the road connected with the target area based on the road monitoring video in the target area before the current time. Next, the processing device may determine a number of first vehicles, the first average speeds of which are less than a first preset threshold. When the number of first vehicles is greater than a second preset threshold, the processing device may obtain the road monitoring video in the target area at the current time, obtain a second average speed of each of the plurality of vehicles at the current time based on the road monitoring video at the current time, determine a number of second vehicles, the second average speeds of which are less than the first preset threshold. Finally, the processing device may compare the number of the first vehicles with the number of the second vehicles and adjust the target area based on a comparison result. For example, if a reduced value between the number of second vehicles and the number of first vehicles is greater than a third preset threshold, it is considered that the traffic congestion in the target area is caused by slow driving of individual vehicles. With departure of individual vehicles in an area, the traffic will no longer be congested, so this area is not predicted as the target area.

The second strategy adjustment feature 410-3 may refer to adjusting one or more target areas 430 based on a change rate of vehicle flow in the target area.

The change rate of vehicle flow is a value reflecting a speed of vehicle flow change, which may also be referred to as vehicle flow acceleration. The change rate of vehicle flow, for example, may reflect a change speed of increase or decrease of vehicle flow.

In some embodiments, the processing device may determine a number of vehicles in continuous multi frame images through a second model based on continuous multi frame images collected by the sensor device and perform a linear fitting based on the number of vehicles in the continuous multi frame images. A slope of the fitting curve may be the change rate of vehicle flow. Independent variables of the fitting curve may include time of multi frames and dependent variables of the fitting curve may include number of vehicles corresponding to the time of multi frames.

In some embodiments, the processing device may use the second model to process the image collected by the sensing device to obtain a number of vehicles on the image. For example, the processing device may input the image collected by the sensor device into the second model, and the number of vehicles on the image may be output by the second model. The second model may include DNN, RNN, CNN, or the like. The processing device may use historical image as training data to train the second model, so that the second model may output the number of vehicles on the historical image based on the historical image. The label corresponding to the training data may be determined manually.

In some embodiments, the processing device may obtain the change rate of vehicle flow in the target area based on the road monitoring video.

In some embodiments, the processing device may obtain the change rate of vehicle flow in the target area and adjust the target area based on the change rate of vehicle flow in the target area. For example, if an area is not predicted as a target area, but its vehicle flow increases rapidly, it indicates that there may be a large influx of vehicles in a short time. In this case, it is likely to cause traffic congestion. Therefore, this area is predicted as a target area.

In some embodiments, the processing device may preset a time period threshold (e.g., 5 minutes, 10 minutes) and a change rate threshold of vehicle flow. If the change rate of vehicle flow during the time period is greater than the change rate threshold of vehicle flow, the target area is adjusted (for example, a non-target area is predicted as a target area).

The target area predicted by the traffic state prediction model may include using the traffic data information during the current time period as an input of the traffic state prediction model and combining with interrelated prediction results of the first strategy adjustment feature or the second strategy adjustment feature, so as to make prediction of the target area by the traffic state prediction model more accurate.

Figure 5:
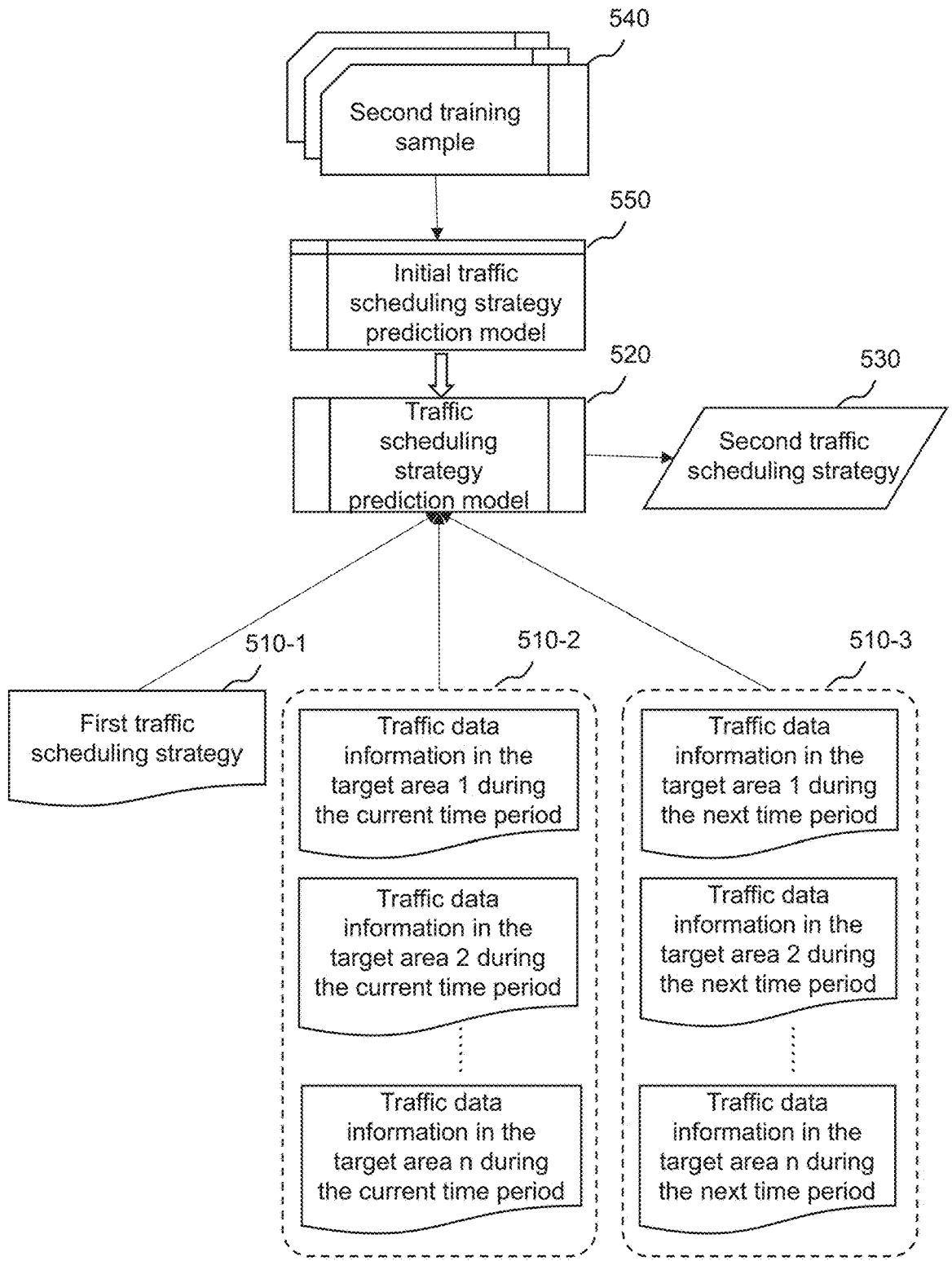
FIG. 5 is a schematic diagram illustrating an exemplary structure of a traffic scheduling strategy prediction model according to some embodiments of the present disclosure.

FIG. 5 is a schematic diagram illustrating an exemplary structure 500 of a traffic scheduling strategy prediction model according to some embodiments of the present disclosure.

In some embodiments, as shown in FIG. 5, an input of the traffic scheduling strategy prediction model 520 may include a first traffic scheduling strategy 510-1, the traffic data information 510-2 in the one or more target areas during the current time period, and the traffic data information 510-3 in the one or more target areas during the next time period. In some embodiments, an output of the traffic scheduling strategy prediction model 520 may be a second traffic scheduling strategy 530.

In some embodiments, as shown in FIG. 5, parameters of the traffic scheduling strategy prediction model 520 may be trained by a plurality of labeled second training samples 540. In some embodiments, the processing device may obtain a plurality of groups of second training samples 540 based on a large amount of historical data. Each group of the second training samples 540 may include a plurality of training data and labels corresponding to the plurality of training data. The training data may include a historical first traffic scheduling strategy, traffic data information in one or more target areas during a historical time period, and traffic data information in the one or more target areas during the historical next time period. The labels of the training data may be a historical second traffic scheduling strategy manually determined based on actual data.

Parameters of an initial traffic scheduling strategy prediction model 550 may be updated to obtain a trained initial traffic scheduling strategy prediction model 550 based on a plurality of groups of second training samples 540. The parameters of the traffic scheduling strategy prediction model 520 are from the trained initial traffic scheduling strategy prediction model 550.

In some embodiments, the processing device may iteratively update the parameters of the initial traffic scheduling strategy prediction model 550 based on the plurality of groups of second training samples to make a loss function of the initial traffic scheduling strategy prediction model meet a preset condition. For example, the loss function converges, or the value of loss function is less than the preset value. When the loss function meets the preset condition, a training process of the initial traffic scheduling strategy prediction model is completed to obtain a trained initial traffic scheduling strategy prediction model 550. The traffic scheduling strategy prediction model 520 and the trained initial traffic scheduling strategy prediction model 550 have a same model structure.

The first traffic scheduling strategy is switched to the second traffic scheduling strategy through the traffic scheduling strategy prediction model, and the first traffic scheduling strategy and the traffic data information during the current time period and the next time period in the target area are input into the traffic scheduling strategy prediction model to obtain the second traffic scheduling strategy, which significantly improves accuracy of the second traffic scheduling strategy, so as to effectively reduce traffic congestion.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and be intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for traffic scheduling at an intersection in a smart city, executed by a traffic scheduling strategy control management platform, comprising:
    determining, based on a road monitoring video of the intersection in a preset area before a current time, a first average speed of each vehicle among a plurality of vehicles on one or more roads connected with the intersection before the current time;
    determining a number of first vehicles, wherein the first average speed of each first vehicle is less than a first preset threshold;
    obtaining the road monitoring video of the intersection at the current time when the number of the first vehicles is greater than a second preset threshold;
    obtaining, based on the road monitoring video at the current time, a second average speed of each vehicle among the plurality of vehicles at the current time;
    determining a number of second vehicles, wherein the second average speed of each second vehicle is less than the first preset threshold;
    determining whether traffic congestion is likely to occur at the intersection during a next time period based on a comparison result obtained by comparing the number of the first vehicles with the number of second vehicles;
    in response to determining that the traffic congestion is likely to occur at the intersection during the next time period, determining whether a traffic scheduling strategy is needed to be switched based on traffic data information of the intersection during the next time period; and
    in response to determining that the traffic scheduling strategy is needed to be switched, switching a first traffic scheduling strategy to a second traffic scheduling strategy.

2. The method of claim 1, further comprising:
    obtaining, based on an object platform, the traffic data information through a management platform database, and
    obtaining, based on the management platform database, the traffic data information through a management sub-platform database.

3. The method of claim 2, wherein the obtaining, based on an object platform, the traffic data information through a management platform database includes:
    obtaining, based on the object platform, the traffic data information through a sensor information management platform and a sensor network platform database by the management platform database, wherein the object platform is configured as a road monitoring device, an Unmanned Aerial Vehicle (UAV) shooting device, and a user terminal.

4. The method of claim 2, wherein the obtaining, based on an object platform, the traffic data information by a management platform database includes:

obtaining special vehicle driving route information from the road monitoring device through a sensor information management platform and a sensor network platform database by the management platform database, and uploading the special vehicle driving route information to a special vehicle database corresponding to a special vehicle management platform by the management platform database.

5. The method of claim 1, wherein the traffic scheduling strategy includes at least one of a number of scheduled traffic police, duration of traffic lights, or temporary traffic control.

6. The method of claim 1, further comprising:
in response to determining that the traffic congestion is not likely to occur at the intersection during the next time period, obtaining a change rate of vehicle flow of the intersection based on the road monitoring video; and
determining whether the traffic congestion is likely to occur at the intersection during the next time period based on the change rate of vehicle flow of the intersection.

7. The method of claim 6, wherein the obtaining a change rate of vehicle flow of the intersection based on the road monitoring video includes:
determining a number of vehicles in continuous multi frame images through a second model based on the continuous multi frame images of the road monitoring video; and
performing a linear fitting based on the number of vehicles in the continuous multi frame images, and determining a slope of a fitting curve as the change rate of vehicle flow, wherein independent variables of the fitting curve include time of the continuous multi frame images, and dependent variables of the fitting curve include a number of vehicles corresponding to the time of the continuous multi frame images.

8. The method of claim 6, wherein the determining whether the traffic congestion is likely to occur at the intersection during the next time period based on the change rate of vehicle flow of the intersection includes:
determining whether the change rate of vehicle flow at the intersection is greater than a change rate threshold during a preset time period; and
in response to determining that the change rate of vehicle flow at the intersection is greater than a change rate threshold, determining that the traffic congestion is likely to occur at the intersection during the next time period.

9. The method of claim 1, wherein the switching a first traffic scheduling strategy to a second traffic scheduling strategy includes:
determining the second traffic scheduling strategy through a traffic scheduling strategy prediction model based on the first traffic scheduling strategy and the traffic data information of the intersection during the current time period and the next time period, wherein the traffic scheduling strategy prediction model is a deep learning model.

10. An Internet of Things (IoT) system for traffic scheduling at an intersection in a smart city, comprising a user platform, a service platform, a traffic scheduling strategy control management platform, a sensor network platform, and an object platform interacting in sequence, wherein the traffic scheduling strategy control management platform is configured to perform operations comprising:
determining, based on a road monitoring video of the intersection in a preset area before a current time, a first average speed of each vehicle among a plurality of vehicles on one or more roads connected with the intersection before the current time;
determining a number of first vehicles, wherein the first average speed of each first vehicle is less than a first preset threshold;
obtaining the road monitoring video of the intersection at the current time when the number of the first vehicles is greater than a second preset threshold;
obtaining, based on the road monitoring video at the current time, a second average speed of each vehicle among the plurality of vehicles at the current time;
determining a number of second vehicles, wherein the second average speed of each second vehicle is less than the first preset threshold;
determining whether traffic congestion is likely to occur at the intersection during a next time period based on a comparison result obtained by comparing the number of the first vehicles with the number of second vehicles;
in response to determining that the traffic congestion is likely to occur at the intersection during the next time period, determining whether a traffic scheduling strategy is needed to be switched based on traffic data information of the intersection during the next time period; and
in response to determining that the traffic scheduling strategy is needed to be switched, switching a first traffic scheduling strategy to a second traffic scheduling strategy.

11. The IoT system of claim 10, wherein the traffic scheduling strategy control management platform is further configured to perform operations including:
obtaining, based on the object platform, the traffic data information through a management platform database, and
obtaining, based on the management platform database, the traffic data information through a management sub-platform database.

12. The IoT system of claim 11, wherein to obtain, based on an object platform, the traffic data information through a management platform database, the traffic scheduling strategy control management platform is further configured to perform operations including:
obtaining, based on the object platform, the traffic data information through a sensor information management platform and a sensor network platform database by the management platform database, wherein the object platform is configured as a road monitoring device, an Unmanned Aerial Vehicle (UAV) shooting device, and a user terminal.

13. The IoT system of claim 11, wherein to obtain, based on an object platform, the traffic data information through a management platform database, the traffic scheduling strategy control management platform is further configured to perform operations including:
obtaining special vehicle driving route information from the road monitoring device through a sensor information management platform and a sensor network platform database by the management platform database, and
uploading the special vehicle driving route information to a special vehicle database corresponding to a special vehicle management platform by the management platform database.

14. The IoT system of claim 10, wherein the traffic scheduling strategy includes at least one of a number of scheduled traffic police, duration of traffic lights, or temporary traffic control.

15. The IoT system of claim 10, wherein the traffic scheduling strategy control management platform is further configured to perform operations including:
in response to determining that the traffic congestion is not likely to occur at the intersection during the next time period, obtaining a change rate of vehicle flow of the intersection based on the road monitoring video; and
determining whether the traffic congestion is likely to occur at the intersection during the next time period based on the change rate of vehicle flow of the intersection.

16. The IoT system of claim 15, wherein to obtain a change rate of vehicle flow of the intersection based on the road monitoring video, the traffic scheduling strategy control management platform is further configured to perform operations including:
determining a number of vehicles in continuous multi frame images through a second model based on the continuous multi frame images of the road monitoring video; and
performing a linear fitting based on the number of vehicles in the continuous multi frame images, and determining a slope of a fitting curve as the change rate of vehicle flow, wherein independent variables of the fitting curve include time of the continuous multi frame images, and dependent variables of the fitting curve include a number of vehicles corresponding to the time of the continuous multi frame images.

17. The IoT system of claim 15, wherein to determine whether the traffic congestion is likely to occur at the intersection during the next time period based on the change rate of vehicle flow of the intersection, the traffic scheduling strategy control management platform is further configured to perform operations including:
determining whether the change rate of vehicle flow at the intersection is greater than a change rate threshold during a preset time period; and
in response to determining that the change rate of vehicle flow at the intersection is greater than a change rate threshold, determining that the traffic congestion is likely to occur at the intersection during the next time period.

18. The IoT system of claim 10, wherein to switch a first traffic scheduling strategy to a second traffic scheduling strategy, the traffic scheduling strategy control management platform is further configured to perform operations including:
determining the second traffic scheduling strategy through a traffic scheduling strategy prediction model based on the first traffic scheduling strategy and the traffic data information of the intersection during the current time period and the next time period, wherein the traffic scheduling strategy prediction model is a deep learning model.

19. A non-transitory computer readable storage medium storing a set of instructions, when executed by at least one processor, causing at least one processor to perform a method for traffic scheduling at an intersection in a smart city comprising:
determining, based on a road monitoring video of the intersection in a preset area before a current time, a first average speed of each vehicle among a plurality of vehicles on one or more roads connected with the intersection before the current time;
determining a number of first vehicles, wherein the first average speed of each first vehicle is less than a first preset threshold;
obtaining the road monitoring video of the intersection at the current time when the number of the first vehicles is greater than a second preset threshold;
obtaining, based on the road monitoring video at the current time, a second average speed of each vehicle among the plurality of vehicles at the current time;
determining a number of second vehicles, wherein the second average speed of each second vehicle is less than the first preset threshold;
determining whether traffic congestion is likely to occur at the intersection during a next time period based on a comparison result obtained by comparing the number of the first vehicles with the number of second vehicles;
in response to determining that the traffic congestion is likely to occur at the intersection during the next time period, determining whether a traffic scheduling strategy is needed to be switched based on traffic data information of the intersection during the next time period; and
in response to determining that the traffic scheduling strategy is needed to be switched, switching a first traffic scheduling strategy to a second traffic scheduling strategy.

* * * * *